United States Patent [19]

Hirschberger

[11] Patent Number: 5,046,938

[45] Date of Patent: Sep. 10, 1991

[54] IMPROVED MULTIPLE LAYER DIE HEAD WITH ADJUSTABLE GAPS

[75] Inventor: Michael Hirschberger, Sylvania, Ohio

[73] Assignee: Hoover Universal, Inc., Plymouth, Mich.

[21] Appl. No.: 528,536

[22] Filed: May 25, 1990

Related U.S. Application Data

[63] Continuation-in-part of Ser. No. 430,525, Nov. 1, 1989, abandoned.

[51] Int. Cl.⁵ .................. B29C 47/06; B29C 47/92
[52] U.S. Cl. ............................ 425/133.1; 425/141
[58] Field of Search ............ 425/133.1, 141, 381, 425/466

[56] References Cited

U.S. PATENT DOCUMENTS

| | | | |
|---|---|---|---|
| 4,111,630 | 9/1978 | Shiomi et al. | 425/466 X |
| 4,149,839 | 4/1979 | Iwawaki et al. | 425/133.1 |
| 4,171,195 | 10/1979 | Klein et al. | 425/141 |
| 4,185,954 | 1/1980 | Murakami et al. | 425/466 X |
| 4,197,069 | 4/1980 | Cloeren | 425/131.1 |
| 4,464,104 | 8/1984 | Gneuss | 425/466 X |
| 4,465,449 | 8/1984 | Hornbeck | 425/133.1 X |
| 4,522,775 | 6/1985 | Briggs et al. | 425/133.1 X |
| 4,578,025 | 3/1986 | Ando et al. | 425/133.1 |

Primary Examiner—Richard L. Chiesa
Attorney, Agent, or Firm—Harness, Dickey & Pierce

[57] ABSTRACT

An extrusion die head for producing multiple layer tubular plastic bodies is disclosed in which the size of the tubular resin flow passage for at least one of the resin layers is infinitely adjustable at the point where two or more resin layers merge together to form a multiple layer stream. The adjustable passages are formed by two spaced inclined surfaces at the downstream end of the passages. The thickness of the passages is varied by axially moving one surface relative to the other. The moveable inclined surface is carried on an annular ring member mounted in the die head. In one embodiment, the ring is replaceable with another ring member to axially move the surface, thereby adjusting the layer thickness. In another embodiment, the ring member is threadably mounted in the die head so that rotation of the ring causes axial movement of the surface to adjust layer thickness. In the preferred embodiment the ring member is rotated by a drive mechanism operable from outside the die head for adjustment without disassembly of the die head. Adjustability of the gap sizes in the die head widens the range the relative thicknesses of the layers and widens the range of relative viscosity values that can be used. The versatility and usefulness of the die head is thus increased over that of die heads employing fixed gaps.

15 Claims, 6 Drawing Sheets

IMPROVED MULTIPLE LAYER DIE HEAD WITH ADJUSTABLE GAPS

CROSS REFERENCE IN RELATED APPLICATIONS

This application is a continuation in part of application Ser. No. 430,525, filed Nov. 1, 1989 now abandoned.

BACKGROUND AND SUMMARY OF THE INVENTION

This invention relates to an apparatus for the formation of multi-layer laminates of thermoplastic materials in an extrusion system in which diverse thermoplastic materials are formed into multiple layers of desired thicknesses, and more particularly to an infinitely adjustable extrusion die head for the extrusion of thermoplastics over a wide range of relative thicknesses and viscosities.

This invention is useful in die heads for the manufacture of plastic bottles, pipes, and film as well as plastic coated wires, cables, optic fibers, etc. There are many advantages achieved by the production of multi-layer constructions of thermoplastics as these materials enable a combination of properties not presently obtained in a single material structure. In co-extrusion, two or more diverse thermoplastic materials form separate molten layers which converge and join under pressure within the die to emerge as a single laminated material. Such processes make use of the laminar flow principle which enables the two or more molten layers to join in a common flow channel without intermixing thereof at the contacting interfaces under proper operating conditions.

The present invention therefore is concerned with so-called multiple layer extrusion systems which have come into recent prominent use as they provide a convenient way of melt lamination, co-extrusion coating and the like, but more particularly provide for formation of multiple layers of similar or dissimilar thermoplastics materials. This invention is more particularly concerned with annular die systems. In general, such dies or adapters are designed with an individual flow channel of fixed dimensions for each layer and normally the layers are brought into contact prior to the exit orifice of the die.

Many devices are known to the art for production of co-extruded tubular articles of this type. In the prior art devices, however, there is no provision for infinite adjustment of the cross-sectional areas of one or more of the extrusion passages so as to enable the production of multiple layer thermoplastic laminates wherein the relative thicknesses of the layers can be changed and wherein adjustments can be made to accommodate thermoplastics that differ widely in their relative viscosities.

A co-extrusion die head with fixed gaps defining the cross-sectional areas of the individual resin passages will operate satisfactorily within a relatively narrow range of relative layer thickness and relative viscosities for which it was designed. Attempts to operate such a die head at substantially different relative thicknesses or viscosity ratios will generally lead to visual and/or structural defects in the finished products due to flow instabilities occurring at the interface of the flowing layers. This interfacial instability phenomenon was documented by C. D. Han in Chapter 8 of his monograph "Multiphase Flow in Polymer Processing" (Academic Press, 1981).

The operating range of a co-extrusion die head is chiefly determined by the cross-sectional areas of the individual flow channels at the point of merger of the molten streams. Plastic melts of substantially similar viscosity values will generally merge in a steady and consistent fashion when their individual velocities are substantially similar. For a die head of given cross-sectional areas this guideline defines the relative thickness or proportion of each layer in the finished product. Attempting to make a substantial change in the layer structure merely by changing the flow rate of the individual materials can lead to interfacial instability. If the same die head is to be used with materials of substantially different viscosities, the ratio of stream velocities at the merging point might have a different optimum value in order to avoid interfacial instability. As a result, it may be impossible to maintain the same layer structure produced on the die head with materials of substantially different viscosities from those for which the die head was designed.

A multiple layer die head with fixed gaps is thus limited in terms of the relative proportions and the relative viscosity values of the resin layers which can be produced with the die head.

One prior patent which addresses this limitation is Cloeren U.S. Pat. No. 4,197,069 which discloses a die head for manufacturing multiple layered sheet products. This device utilizes vanes to infinitely adjust the stream velocities at the merging point. This system, however, is limited to a flat die head configuration, and cannot be utilized in die heads with annular flow channels.

Another related device is described in Ando et al. U.S. Pat. No. 4,578,025. This device utilizes replaceable mandrel segments that define certain cross-sectional areas of flow. This system, however, is cumbersome due to the necessity to disassemble substantial portions of the die head in order to change the desired segment of interest, thereby imposing a long optimization and set-up time to achieve a target layer structure.

It is an object of the present invention to provide an improved extrusion die head for the simultaneous extrusion of multiple layers of diverse thermoplastic materials wherein the flow passages at the point or points of intersection in the die head can be adjusted to provide a laminated product having layers of different relative thicknesses and to accommodate thermoplastic materials having a wide range of relative viscosity values.

It is another object of the invention to provide a die head in which the flow passages can be infinitely adjusted.

A further object of the invention is to provide an improved extrusion die head for the simultaneous extrusion of multiple layers of thermoplastic materials of different thicknesses, flow rates and viscosities wherein the adjustments of the passages is relatively easy to accomplish and does not require substantial disassemble of the entire die head.

It is a further object of this invention to provide means to adjust said passage without replacement of any components of the die head.

The present invention is related to the type of die head that includes an annular channel for each resin used in forming the multiple layer plastic article. Each of the channels direct the resin toward the die head outlet orifice. Immediately upstream of the merger point of two or more resin streams, the sidewalls of each annular channel include opposing concentric surfaces which are inclined relative to the longitudinal axis of the die head. The clearance between the opposing inclined surfaces and the channel diameter determine the cross-sectional area of the gap opening. In the die head of the present invention, one of the two inclined surfaces forming the gap can be moved axially so as to increase or decrease the clearance between the opposing surfaces.

The die head provides for axial movement of the inclined surfaces by incorporating the moveable inclined surface into an annular member whose position can be changed axially in the die head. Preferably the annular members are threadably mounted in the die head so that the gap size can be adjusted by rotating the annular members. In one embodiment the annular members are adjustable by drive means which are operable from outside of the die head eliminating the need for disassembly of the die and mandrel.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE PREFERRED EMBODIMENTS

Figure 1:
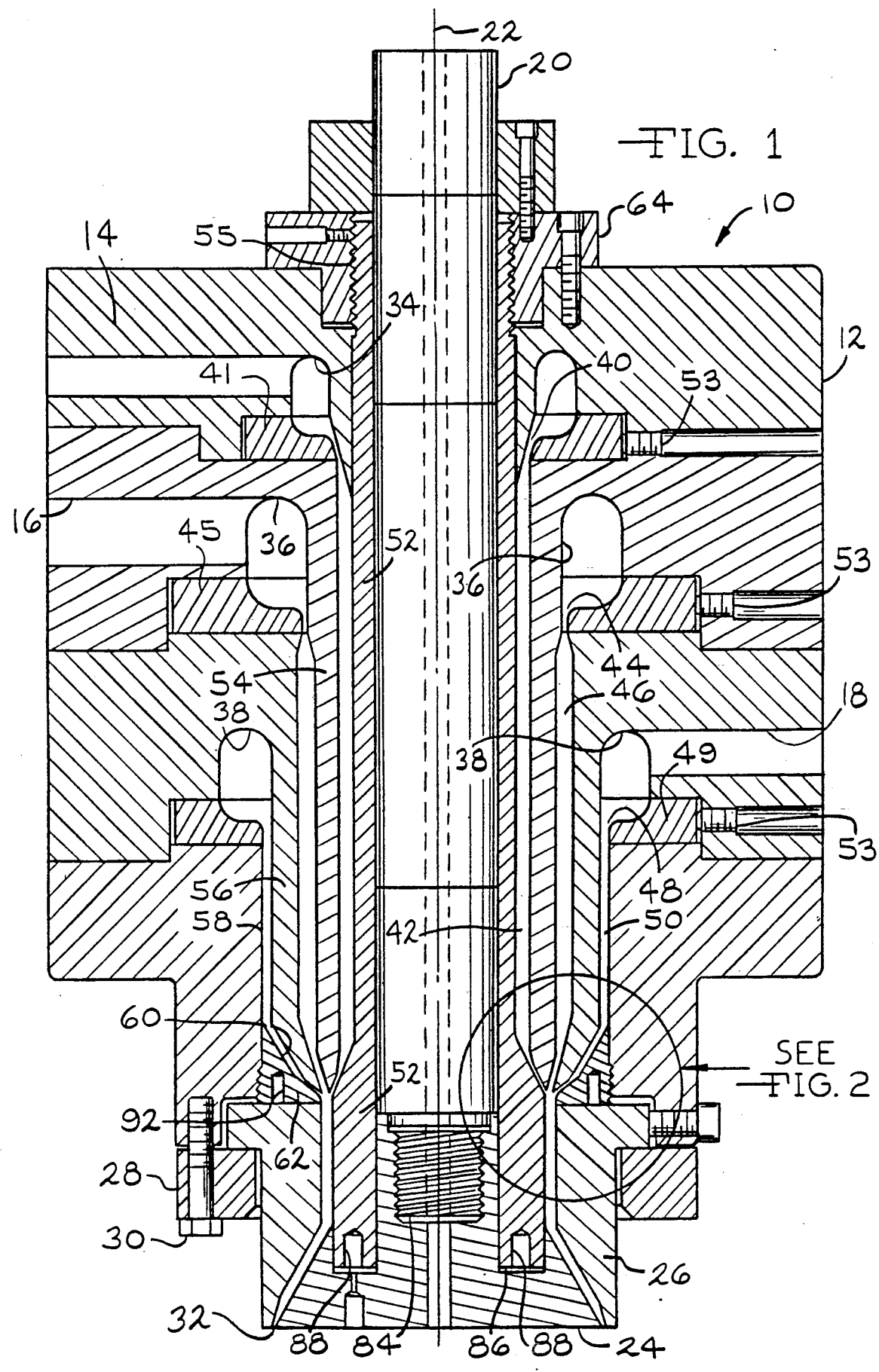
FIG. 1 is a cross-sectional view of the die head of the present invention.

The die head of the present invention having adjustable gaps for improved flexibility of the die head regarding changes in the layer structure and in accommodating resins of wider viscosity ranges in producing a multiple layer body is designated generally by 10 in FIG. 1. Die head 10 is configured for producing a three layer body for flow molding although the invention is not limited to a three layer die head or one for blow molding. The die head 10 includes a die body 12 which has three resin inlet passages 14, 16 and 18. A pin 20 extends longitudinally through the die body 10 about the longitudinal axis 22 of the die body 12. Attached to the lower end of the pin 20 is a mandrel 24. Mandrel 24 is surrounded by a die 26 mounted to the lower end of the die body 12 by a support member 28 attached to the die body with a plurality of bolts 30, only one of which is shown. The mandrel and die are spaced from one another forming an annular outlet orifice 32 at an end of the die head. Molten resins which are supplied to the resin inlet passages from screw extruders (not shown) are shaped in the die head to form a tubular plastic body having three concentric layers, one layer of resin from each inlet passage, which is then extruded through the outlet orifice 32 forming a tubular plastic body or parison.

Resin from inlet passage 14 flows into an annular chamber 34 while resin from inlets 16 and 18 flow into annular chambers 36 and 38, respectively. From annular chamber 34, the resin flows downwardly from the chamber outlet 40 into annular resin flow passage 42 where the resin forms a tubular body flowing toward the outlet orifice. Likewise, the resin in chamber 36 flows through outlet 44 into annular passage 46 while the resin in chamber 38 flows through outlet 48 into annular passage 50. The circumferential uniformity of the thickness of each resin layer is controlled by rings 41, 45 and 49. The rings form one side of the annular chamber outlets 40, 44 and 48, respectively. The uniformity of the outlet thickness is adjusted by a plurality of screws 53 which extend radially from each ring.

The passage 42 is formed by the outer surface of mandrel sleeve 52 which surrounds the pin 20, and by the inner surface of cylindrical partition 54. The passage 46, concentric about passage 42, is formed by the outer surface of cylindrical partition 54 and the inner surface of cylindrical partition 56. The passage 50, concentric about both passages 46 and 42 is formed by the outer surface of cylindrical partition 56 and the inner surface 58 of the die body 12. Toward the end of passage 50, the outer boundary of the passage is formed by the surface 60 of ring member 62.

Sleeve 52 is threadably mounted in the die body 12 through collar 64 which is bolted to the top of die body 12.

Figure 2:
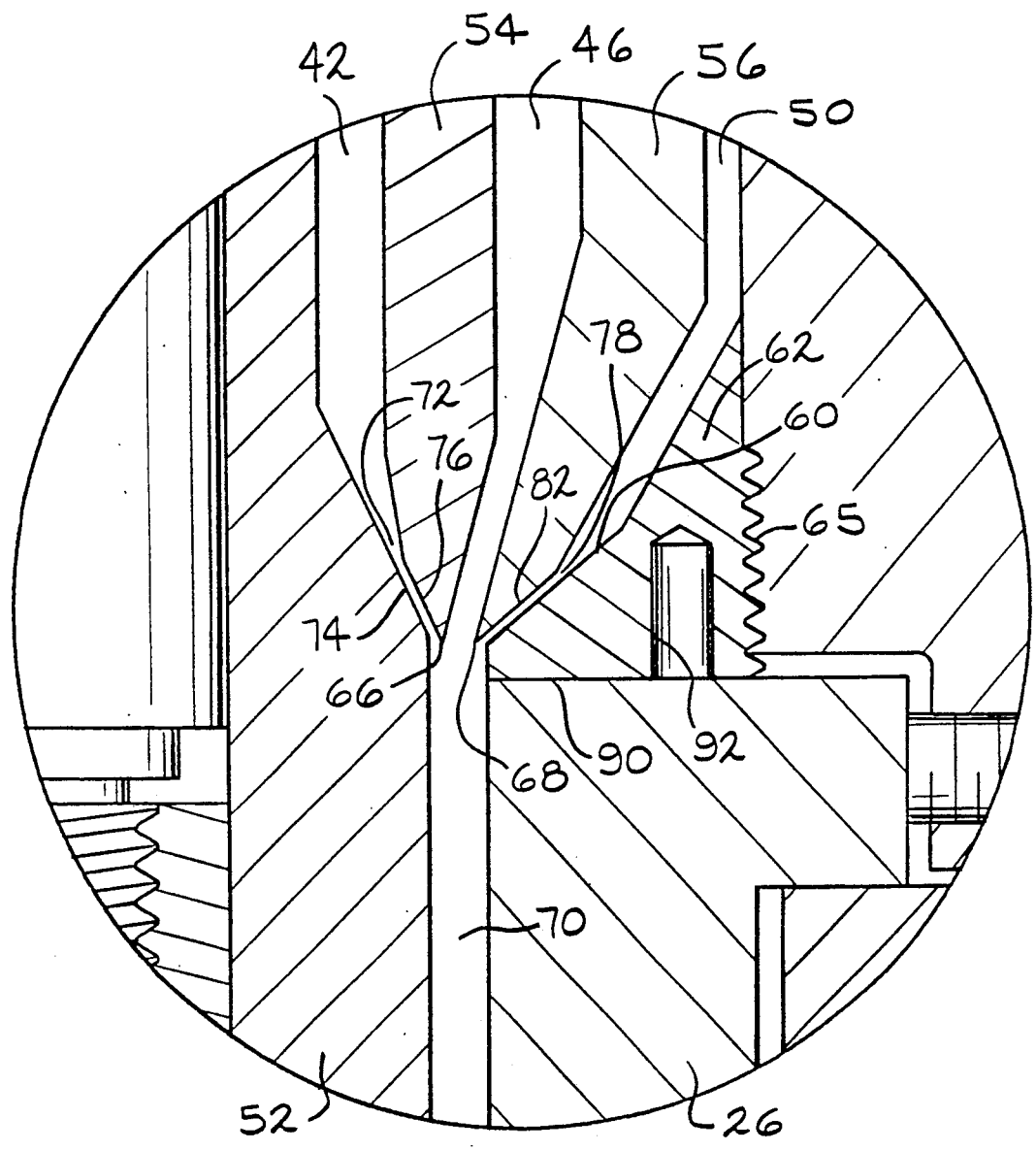
FIG. 2 is an enlarged view of the portion of the die head contained within the circle 2 of FIG. 1.

With reference to FIG. 2, the two cylindrical partitions 54 and 56 terminate at ends 66 and 68 where the three passages 42, 46 and 50 merge together to form a single tubular resin conduit 70. The individual resins flowing through the passages 42, 46 and 50 will merge together to form a single resin body having three layers, one layer of each of the three resins. It is at the point of merger where the flow velocity of the three resins must be controlled within optimum ranges to avoid disturbances in the resin flow which can cause a defect in the finished container.

The velocity of each resin at this point is determined by the volumetric flow rate of each resin and the cross-sectional area of the gap at the end of the annular passage through which the resin flows. Resin in passage 42 must flow through the gap 72 formed by the surface 74 of sleeve 52 and the surface 76 of cylindrical partition 54. The surfaces 74 and 76 face one another and are both inclined relative to the longitudinal axis 22 of the die head. Likewise, the passage 50 terminates in a gap 78 formed by the clearance between surface 60 of ring 62 and surface 82 of cylindrical partition 56. Both surfaces 60 and 82 are inclined relative to the axis. The size of gap 72 can be varied by raising and lowering the sleeve 52 to axially move the surface 74 either toward or away from the surface 76. Likewise, the size of gap 78 can be varied by axially raising or lowering the surface 60 to move surface 60 away from or toward the surface 82. Both sleeve 52 and ring 62 can be rotated as a result of being threadably mounted in the die body. Sleeve 52 is mounted by threads 55 while the ring 62 is mounted by threads 65.

Adjustment of gap 72 is accomplished by rotation of sleeve 52. To rotate the sleeve 52, it is necessary to remove mandrel 24 from pin 20. Mandrel 24 is threaded to pin 22 as indicated by threads 84 at the end of pin 20. Once the mandrel has been removed, the end 86 of the sleeve 52 is exposed. The sleeve end includes apertures 88 into which the pins of an appropriate wrench can be inserted to rotate the sleeve.

Adjustment of gap 78 requires that the mandrel 24 and die 26 both be removed from the die head. This exposes the lower surface 90 of ring 62 and the apertures 92 in the ring into which the pins of a wrench are inserted for rotating ring 62. By rotating the sleeve 52 and ring 62, the gaps 72 and 78 at the bottom of the radially innermost and outermost annular passages can be adjusted. By so doing, if it is desired to change the relative thicknesses of the individual resin layers, both the volumetric flow rate of the resin and the cross-sectional area of the gap can be adjusted to enable the velocity ratios of the various resins to remain at the optimum values. In so doing, the versatility of the die head is increased.

The die head 10, shown in FIGS. 1 and 2 meets the objectives set forth above of providing a die head with adjustable gaps to varying the layer structure and/or accommodate resins of various relative viscosities. The adjustment is infinitely variable and can be accomplished with minimal disassembly of the die head.

Figure 3:
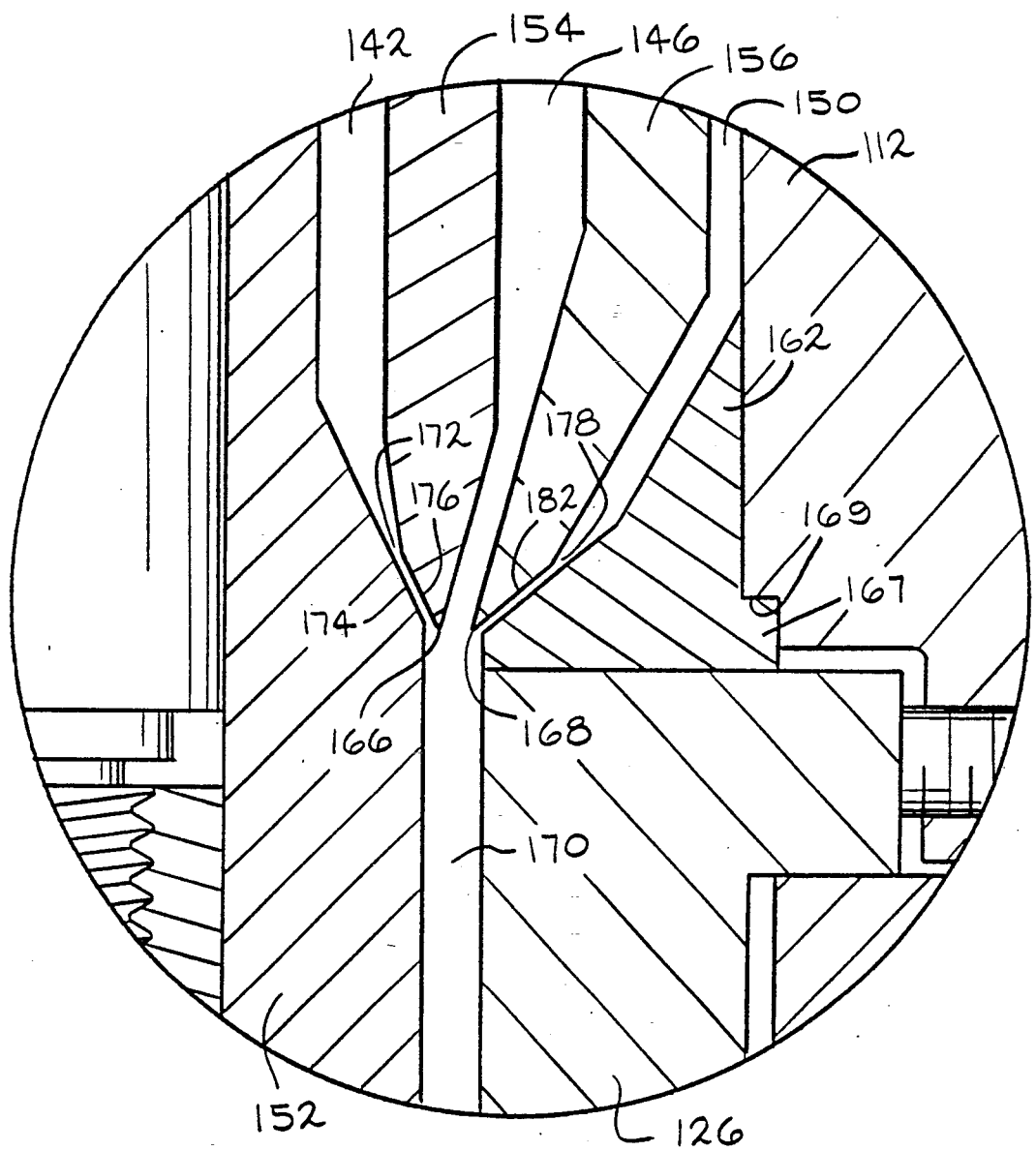
FIG. 3 is an enlarged view like FIG. 2 showing a different embodiment of the invention.

A different embodiment of the invention is shown in FIG. 3 where like components are given the same reference numeral with the addition of 100. In this embodiment the ring 162 is not threaded into the die body 112. The ring includes a radially outwardly extending shoulder 167 which is seated in an annular notch 169 in the lower portion of the die body 112. To adjust the gap 178, the die and mandrel are removed and the ring 162 is replaced with a ring having a shoulder 167 with a different axial thickness. While this embodiment provides for an adjustment gap, other objectives related to infinite adjustment without component replacement are not met with this embodiment.

Figure 4:
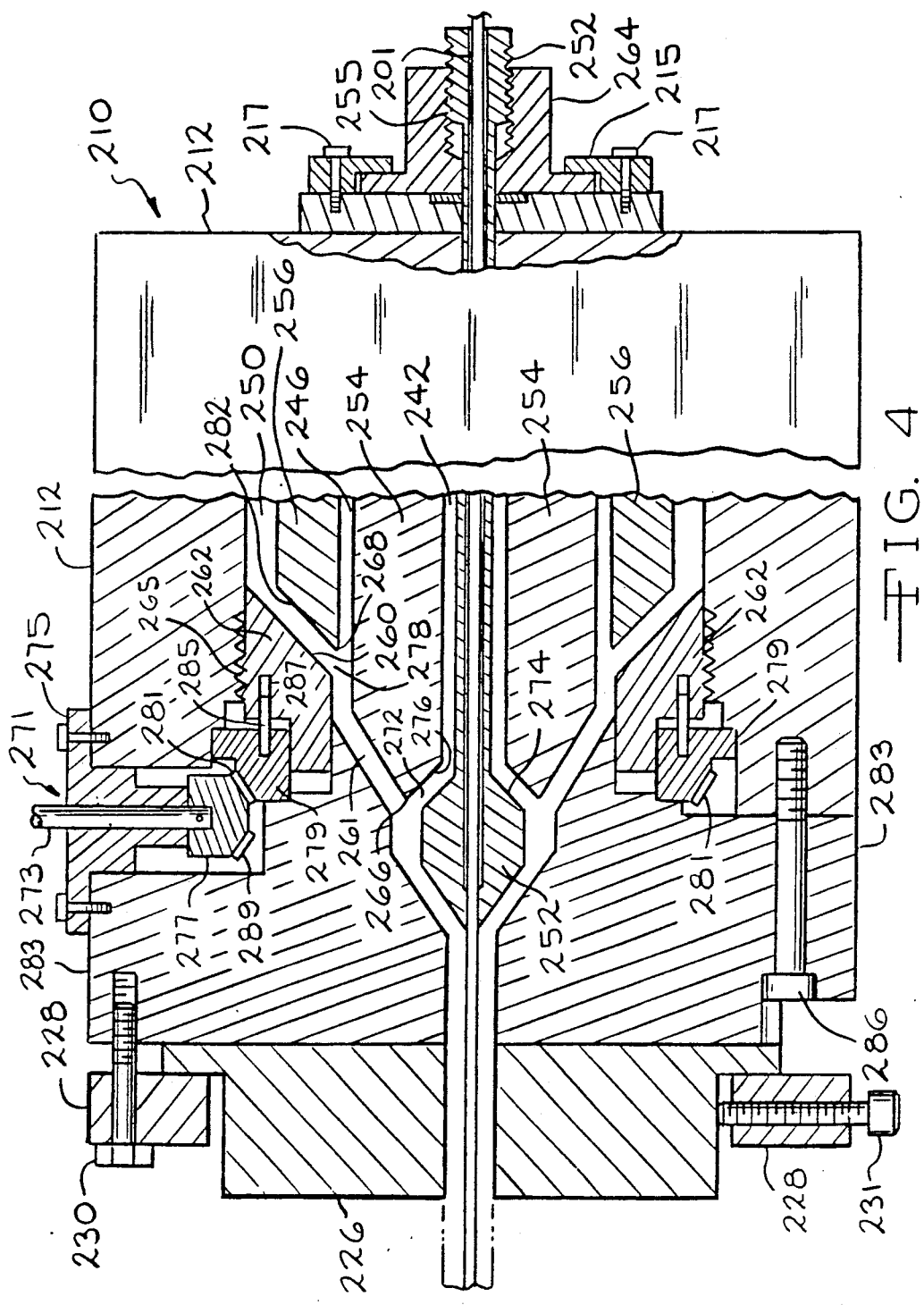
FIG. 4 is a cross-sectional view of a die head illustrating a modified form of the invention having an exteriorly operated adjustment mechanism.

A preferred embodiment is shown in FIG. 4 in which the annular adjustment members can be moved form outside of the die head enabling adjustment without any disassembly of the die head. Components similar to those in die head 10 are given the same reference numeral with the addition of 200. Die head 210 illustrates use of the invention in the production of coated wire in a horizontal die head. A wire member 201 is axially moved through die head 210 where it is coated with, in this case, a three layer plastic covering. A sleeve 252 surrounds the wire 201 and defines the gap 272 along with partition 254. Sleeve 252 is threadably coupled to collar 264 by threads 255. Collar 264 is in turn held onto die body 112 by retaining ring 215 by bolts 217. The outer periphery of collar 264 is shaped for engagement with a suitable tool for rotating the collar to raise and lower sleeve 252 to adjust the clearance between surfaces 274 and 276 adjusting gap 272.

Gap 278 at the end of annular passage 250 is formed by surface 260 of ring 262 and surface 282 of partition 256. Resin passages 250 and 246 merge at the end 268 of partition 256 into an intermediate resin passage 261. A two layer resin body flows through passage 261 and merges with resin from passage 242 at the end 266 of partition 254 to form a three layer plastic body. Ring 262 is threadably mounted to die body 212 by threads 265. Rotation of ring 262 changes the clearance between surfaces 260 and 282 to adjust the gap.

A drive mechanism 271 is used to rotate ring 262 from the exterior of the die body without disassembly of the die head. Drive mechanism 271 includes a shaft 273 extending through a bushing 275 in the die head exterior for operation of the drive mechanism outside of the die head. Shaft 273 is coupled to a bevel gear 277. Bevel gear 277 is used to rotate a drive ring 279 having teeth 281 for engagement with the bevel gear teeth 289. Drive ring 279 is held in place against die body 212 by die 283 which is secured to die body 212 by internal bolts 286. Die 283 is held firmly against the die body while leaving sufficient clearance around the drive ring 279 to enable the drive ring to rotate freely. Drive ring 279 includes a plurality of axially extending pin members 285 which telescope into corresponding apertures 287 in the ring 262. Rotation of drive ring 279 thus rotates the ring 262 through the sliding coupling between pins 285 and apertures 287.

The upstream end of die 283 is telescoped within the ring member 262 so as to enable the ring to move axially while the die remains stationary.

Adjustment member 226 is mounted to the end of die 283 by mounting ring 228 and bolts 230. The position of member 226 is controlled by radial bolts 231 to adjust the concentricity of the plastic body about wire 201.

Figure 5:
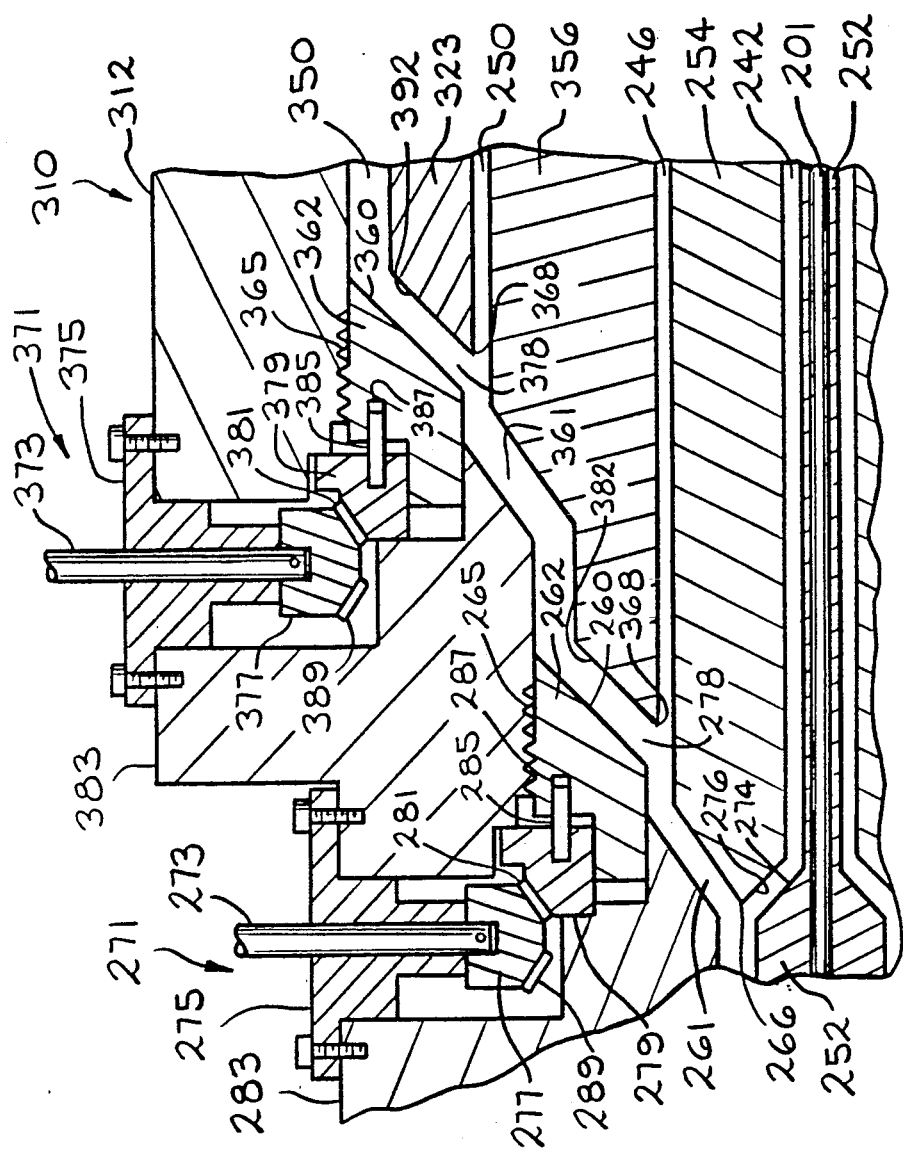
FIG. 5 is a cross-sectional view of a die head similar to the die head of FIG. 4 for producing a four layer plastic body.

Die head 210 is used for forming a triple layer plastic body. The invention in die head 210 can however be used to form articles having more layers than three. A modified die head 310 is shown in FIG. 5 adding an additional adjusting ring to form a four layer plastic body about the wire 201. Components in die head 310 which are the same as in die head 210 are given the same numeral. Additional components similar to those in die head 210 are given the same numeral plus 100.

Die head 310 adds an adjustment ring 362 to adjust the gap 378 at the end of tubular passage 350. Passage 350 merges with passage 250 at end 368 of partition 323. The resin forms a two layer body which flows into intermediate passage 361 which flows down stream to merge with passage 246. Drive mechanism 371 utilizes a shaft 373 to turn bevel gear 377 to rotate drive ring 379 identically to drive mechanism 271. The drive ring 379 is coupled to adjustment ring 362 through pins 385 as described above with respect to drive mechanism 271. Drive ring 379 is sandwiched between die body 312 and die 383 which is bolted to die body 312 by internal bolts (not shown) such as bolt 285 shown in FIG. 4. Sufficient clearance is provided to enable rotation of drive ring 379. By providing additional adjusting rings and drive mechanisms, additional layers can be provided as desired.

Die heads 210 and 310 meet the objectives of the present invention of providing a die head for simultaneous extrusion of multiple layers of thermoplastic materials in which the flow passages at the point or points of intersection in the die head can be adjusted to provide a laminated product having layers of different relative thicknesses and/or utilize resin materials having a wide range of viscosities. Additionally, the flow passages can be infinitely adjusted, the adjustment can be made without disassembly of the die head and without replacement of die head components.

An additional embodiment for providing adjustable gaps includes axially floating rings within the die head which can be positioned with wedges inserted into the die head from the sides.

Figure 6:
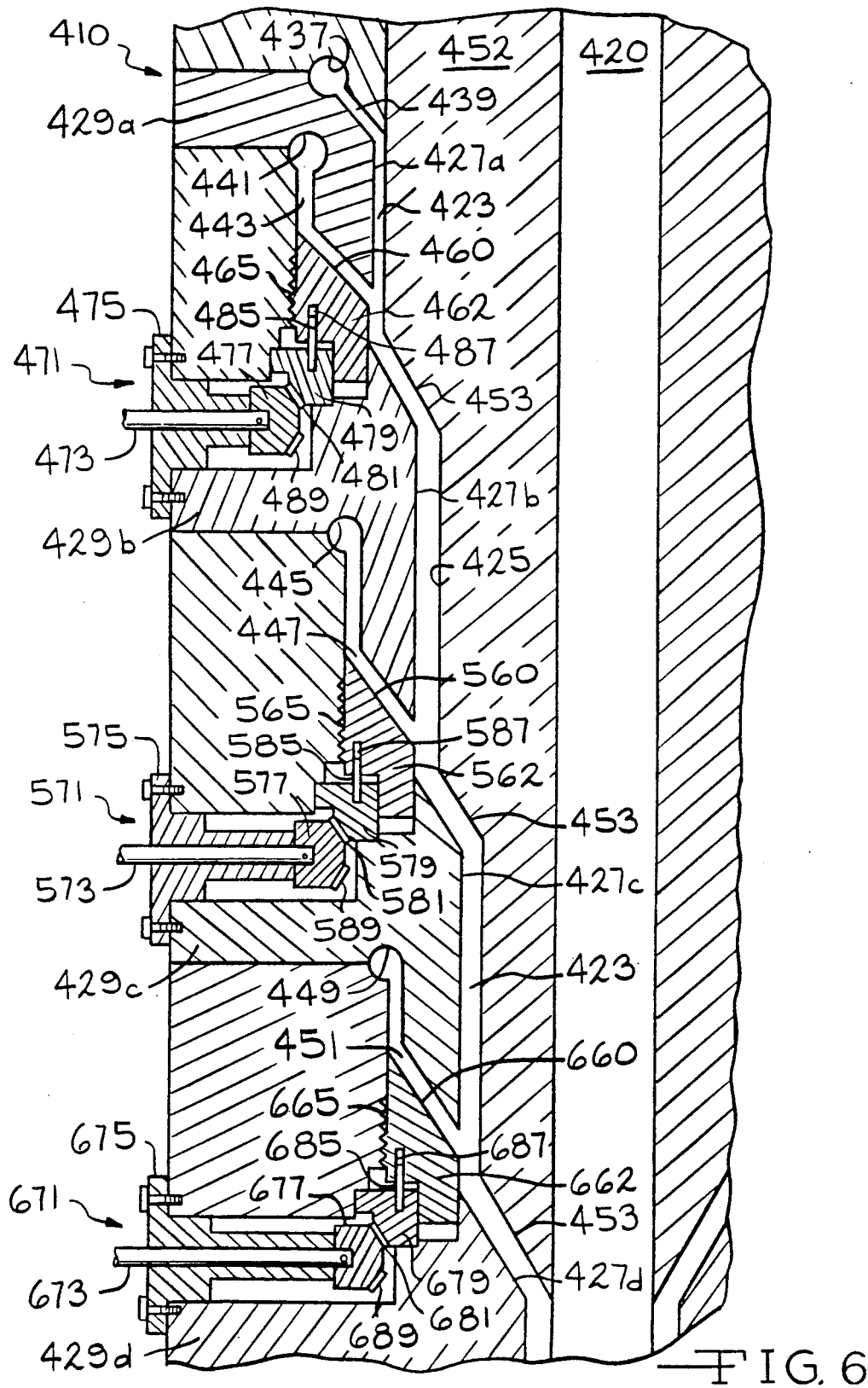
FIG. 6 is a cross-sectional view of a die head illustrating a modified form of the invention having an exteriorly operated adjustment mechanism acting on individual resin layers.

FIG. 6 illustrates another embodiment of the invention in which the gap for each resin layer is adjustable at the point of merger. In die head 410, a mandrel 420 is surrounded by a mandrel sleeve 452. The sleeve 452 has a number of tapered step down portions 453 in which the diameter of the sleeve is reduced. Sleeve 452 is shown in FIG. 6 as being of a single piece construction but could also be constructed of three separate concentric sleeves. An axial flow passage 423 is generally formed by the radially outer surface 425 of the sleeve 452 and the radially inner surfaces 427a–d of collars 429a–d.

Resin from annular chamber 437 flows through the frusto-conical annular passage 439 into the axial flow passage 423. As the resin from chamber 437 flows downstream, a second layer of resin from the annular chamber 441 flows through passage 443 to form a two layer resin body in passage 423. As this two layer body flows through passage 423, a third layer of resin from annular chamber 445, flowing through passage 447, merges with the two layer body forming a three layer body. Finally, a fourth resin layer is added from resin flowing from annular chamber 449 through annular passage 451.

The thickness of the annular passages 443, 447 and 451 at the downstream end of these passages, where they merge with the axial flow passage 423, is adjustable by varying the axial position of the rings 462, 562 and 662. The inclined surfaces 460, 560 and 660 of these rings form the radially outer boundaries of the frusto-conical flow passages. The positions of the rings are adjusted in the same manner as described above with respect to the adjustable rings in FIGS. 4 and 5 above. The rings are adjustable by drive mechanisms 471, 571 and 671 respectively wherein like components are given the same reference numeral as the drive mechanisms 271 and 371 shown in FIG. 5 with a different first digit.

In the die head 410, an adjustable gap is provided for each resin layer that is being added to the outer surface of the previously formed tubular resin body. As a result, only a single resin layer is acted upon by the adjustable gap as opposed to the embodiment of FIG. 5 where it is the thickness of the multiple layer resin body that is subjected to the adjustable gap.

Die head 410 is shown for producing a four layer resin body. Only three of the layers have adjustable gaps at the point of layer merger. This is sufficient to provide adjustment to the thickness ratios of the four layers. The die head can be equipped to produce a body of any number of resin layers by providing additional adjustment rings and drive mechanisms.

The present invention has been described in an illustrative manner and it is to be understood that the terminology that has been used is intended to be in the nature of words of description rather than of limitation. Modifications and variations of the present invention are possible in light of the above teachings. It is to be understood that within the scope of the appended claims, the invention may be practiced otherwise than as specifically described.

While the present invention has been shown and described within the context of a continuous flow die head for blow molding and a die head for wire coating, it is to be understood that the invention can be practiced in other die heads, such as intermittent flow die heads, die heads for the production of plastic tubing, annular die heads for blown film extrusion, etc. by incorporating the adjustable gaps into these die heads.

I claim:

1. A die head for producing a tubular body of multiple resin layers, comprising:

a die body having a longitudinal axis, a plurality of resin inlets for receiving a plurality of molten resins and a annular outlet orifice at one axial end of said die head through which a tubular body of multiple resin layers is extruded;

means within said body forming concentric annular passages to provide annular flow streams of each of said plurality of molten resins, said flow streams being separate from one another and flowing from said inlets toward said outlet orifice;

means for merging said separate concentric flow streams of said resins into a single flow stream having multiple concentric layers of said resins, said merged flow stream flowing through said outlet orifice to form said tubular body; and means for varying the thickness of at least one of said annular passages to uniformly increase or decrease the thickness of said at least one of said annular passages about the entire circumference of said at least one of said annular passages at a downstream end of said at least one of said annular passages immediately upstream of where the resin flow stream in said at least one of said annular passages merges with another of said resin flow streams whereby the proportional thickness of at least one of said multiple concentric layers of resin within said merged flow stream is increased or decreased relative to the thickness of the other resin layers in said merged flow stream.

2. The die head of claim 1 wherein said means for varying the thickness of at least one of said passages includes means for individually varying the thickness of all but one of said passages at the downstream end of said passages.

3. The die head of claim 1 wherein a downstream terminal portion of each variable thickness passage is formed by two spaced annular surfaces which are inclined relative to said axis; and said means for varying the thickness of said passages includes means for axially moving one of said two spaced annular surfaces relative to the other.

4. The die head of claim 3 wherein the thickness of each variable thickness passage is infinitely variable.

5. The die head of claim 3 wherein said one of said two spaced annular surfaces of each variable thickness passage is a surface of an annular member threadably mounted in said die head, said annular member being axially movable in said die head by rotation of said member.

6. The die head of claim 3 wherein said means for moving one of said two spaced annular surfaces includes drive means operable from the exterior of said die head for moving said surface.

7. The die head of claim 6 wherein said one of said two spaced annular surfaces is a surface of an annular member threadably mounted in said die head, said annular member being axially moved by rotation of said member.

8. The die head of claim 7 wherein said drive means includes an annular drive member coupled to said annular member for rotating said annular member.

9. The die head of claim 8 wherein said drive means includes a gear.

10. A die head for producing a tubular resin body of multiple layers, comprising:

a die body having a longitudinal axis, a plurality of inlets for receiving a plurality of molten resins and an annular outlet orifice at one axial end of said die head;

means within said die body forming a plurality of concentric annular passages forming flow streams of each of said plurality of resins, said flow streams being separate from one another and flowing toward said outlet orifice;

means for merging said separate streams into a single body having multiple concentric layers of said resins, said multiple layer body flowing through said outlet orifice;

means for varying the thickness of at least one of said annular passages to uniformly increase or decrease the thickness of said at least one of said annular passages about the entire circumference of said at least one of said annular passages at a downstream end of said at least one passage immediately upstream of where the resin flow stream in said at least one passage merges with another of said resin flow streams whereby the proportional thickness of at lest one of said multiple concentric layers of resin within said multiple layer body is increased or decreased relative to the thickness of the other resin layers in said body, said varying means including two spaced surfaces at said downstream end inclined relative to said axis, one of said surfaces being on an annular member mounted in said die head for axial movement, and means for axially moving said annular member.

11. The die head of claim 10 wherein said annular member is threadably mounted in said die head.

12. The die head of claim 11 wherein said annular member is axially moved by rotation of said member about said axis.

13. The die head of claim 12 further comprising drive means for rotating said member operable from the exterior of said die body.

14. The die head of claim 10 wherein said means for varying the thickness of said at least one passage includes means for varying the thickness of all but one of said plurality of passages.

15. The die head of claim 10 wherein said means for varying the thickness of said at least one passage includes means for varying the thickness of all but the radially innermost passage.

* * * * *